United States Patent
Katsu (10) Patent No.: US 8,067,894 B2
(45) Date of Patent: Nov. 29, 2011

(54) LIGHT SOURCE SYSTEM (75) Inventor: Yoshihiro Katsu, Kanagawa (JP)

(73) Assignee: Sony Corporation, Tokyo (JP)

(*) Notice: Subject to any disclaimer, the term of this patent is extended or adjusted under 35 U.S.C. 154(b) by 413 days.

(21) Appl. No.: 12/314,544

(22) Filed: Dec. 12, 2008

(65) Prior Publication Data
US 2009/0167195 A1 Jul. 2, 2009

(30) Foreign Application Priority Data

Dec. 28, 2007 (JP) ................ P2007-340987

(51) Int. Cl.
H05B 37/02 (2006.01)

(52) U.S. Cl. ........ 315/158; 315/149; 315/291; 315/312; 345/102

(58) Field of Classification Search .................. 315/149, 315/312, 291, 307, 360, 152, 158, 169.3; 362/227, 231, 276, 612, 613; 345/102
See application file for complete search history.

(56) References Cited

U.S. PATENT DOCUMENTS

| 6,281,640 | B1* | 8/2001 | Kim | 315/291 |
| 6,490,037 | B1* | 12/2002 | Schmitt | 356/416 |
| 7,002,546 | B1* | 2/2006 | Stuppi et al. | 345/102 |
| 7,510,300 | B2* | 3/2009 | Iwauchi et al. | 315/149 |
| 7,863,829 | B2* | 1/2011 | Sayers et al. | 315/291 |

FOREIGN PATENT DOCUMENTS

| JP | 2001-142409 | 5/2001 |
| JP | 2005-302737 | 10/2005 |

* cited by examiner

Primary Examiner — Jacob Y Choi
Assistant Examiner — Ephrem Alemu
(74) Attorney, Agent, or Firm — Rader, Fishman & Grauer PLLC (57) ABSTRACT A light source system capable of controlling a light emission amount of a light source section more accurately while keeping manufacturing costs low is provided. The light source system includes a light source, a light-sensing device detecting light from the light source, a calculation means, and a light source control means. The calculation means calculates a net light amount by subtracting a measurement environment component from a light amount detected by the light-sensing device. The measurement environment component is independent of a lighting state in the light source. The light source control means controls the light source on the basis of the net light amount obtained by the calculation means.

12 Claims, 10 Drawing Sheets

| | LED STATE | SW CONNECTION | A/D VALUE OF LIGHT SENSOR (D1) |
|---|---|---|---|
| FIRST LIGHT RECEPTION MODE | LIGHTING | A | D11=D10+Dbg+Dos |
| SECOND LIGHT RECEPTION MODE | NON-LIGHTING | A | D12= Dbg+Dos |
| THIRD LIGHT RECEPTION MODE | NON-LIGHTING | B | D13= Dos |

LIGHT SOURCE SYSTEM

CROSS REFERENCES TO RELATED APPLICATIONS

The present invention contains subject matter related to Japanese Patent Application JP 2007-340987 filed in the Japanese Patent Office on Dec. 28, 2007, the entire contents of which being incorporated herein by reference.

BACKGROUND OF THE INVENTION

1. Field of the Invention

The present invention relates to a light source system used as, for example, a backlight source of a liquid crystal display.

2. Description of the Related Art

In recent years, flat panel displays as typified by liquid crystal TVs and plasma display panels (PDPs) have become a trend, and among them, most of mobile displays are liquid crystal displays, and precise color reproducibility is desired in the mobile displays. Moreover, as backlights for liquid crystal panels, CCFLs (Cold Cathode Fluorescent Lamps) using fluorescent tubes are mainstream; however, mercury-free light sources are environmentally desired, so light emitting diodes (LEDs) and the like hold promise as light sources replacing CCFLs.

As such a backlight system using an LED, for example, techniques described in Japanese Unexamined Patent Application Publication Nos. 2001-142409 and 2005-302737 have been proposed. An LED backlight system shown in Japanese Unexamined Patent Application Publication No. 2001-142409 includes a plurality of separate lighting sections, and carries out lighting operation of each of the lighting sections independently. On the other hand, an LED backlight system shown in Japanese Unexamined Patent Application Publication No. 2005-302737 detects illumination light from a light source by a light-sensing device, and controls the light emission amount of the light source on the basis of a detection value obtained by detecting the illumination light.

SUMMARY OF THE INVENTION

In the case of an LED backlight system shown in Japanese Unexamined Patent Application Publication No. 2005-302737, it is considered that light reception data obtained by a light-sensing device includes a measurement environment component such as a background component including infrared light or an electrical offset component of a circuit section in addition to an original light amount component resulting from illumination light from a light source.

Such a measurement environment component (specifically the background component) causes an adverse effect on light reception operation by a light-sensing device, because the range of temporal variation in the measurement environment component is large due to an influence such as an infrared ray emitted from a remote control of a TV. In other words, such a temporal variation in the background component interfere with proper light reception operation, so in spite of the fact that the light emission amount (luminance) of the light source is in a normal (optimum) state, a detection value by the light-sensing device is not an appropriate value, and as a result, the light emission amount of the light source may be out of an optimum state.

As a means for avoiding the adverse effect on the light reception operation by such a measurement environment component (specifically the background component), it is considered to arrange an infrared filter or the like on the light-sensing device; however, when such a filter is arranged, the number of members in the system is increased, thereby manufacturing costs are increased.

In view of the foregoing, it is desirable to provide a light source system capable of controlling the light emission amount of a light source more accurately while keeping manufacturing costs low.

According to an embodiment of the invention, there is provided a light source system including: a light source; a light-sensing device detecting light from the light source; a calculation means for calculating a net light amount by subtracting a measurement environment component from a light amount detected by the light-sensing device, the measurement environment component being independent of a lighting state in the light source; and a light source control means for controlling the light source on the basis of the net light amount obtained by the calculation means.

According to an embodiment of the invention, there is provided a display device having a light source system, and a display section which modulates light emitted from the light source system on the basis of an image signal, and the light source system has the above-described composition. Moreover, any arbitrary combination of the aforementioned constituent elements and the expression of the present invention changed among a system, an apparatus, a method, and so forth are also effective as the embodiment of the invention.

In the light source system according to the embodiment of the invention, light from the light source is detected by the light-sensing device, and a net light amount by subtracting a measurement environment component from a light amount detected by the light-sensing device is calculated. Then, the light source is controlled on the basis of the net light amount. In other words, in consideration of the measurement environment component being independent of a lighting state in the light source, the light source is controllable on the basis of a light amount component (an original light amount component) resulting from light from the light source. Moreover, it is not necessary to add, for example, a member such as an infrared filter, so manufacturing costs are not increased.

In the light source system according to the embodiment of the invention, the light source is controlled on the basis of the net light amount by subtracting the measurement environment component from the light amount detected by the light-sensing device, so the light source is controllable in consideration of such a measurement environment component, and it is not necessary to add a member, so as a result, while keeping manufacturing costs low, a light emission amount of the light source is controllable more accurately.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
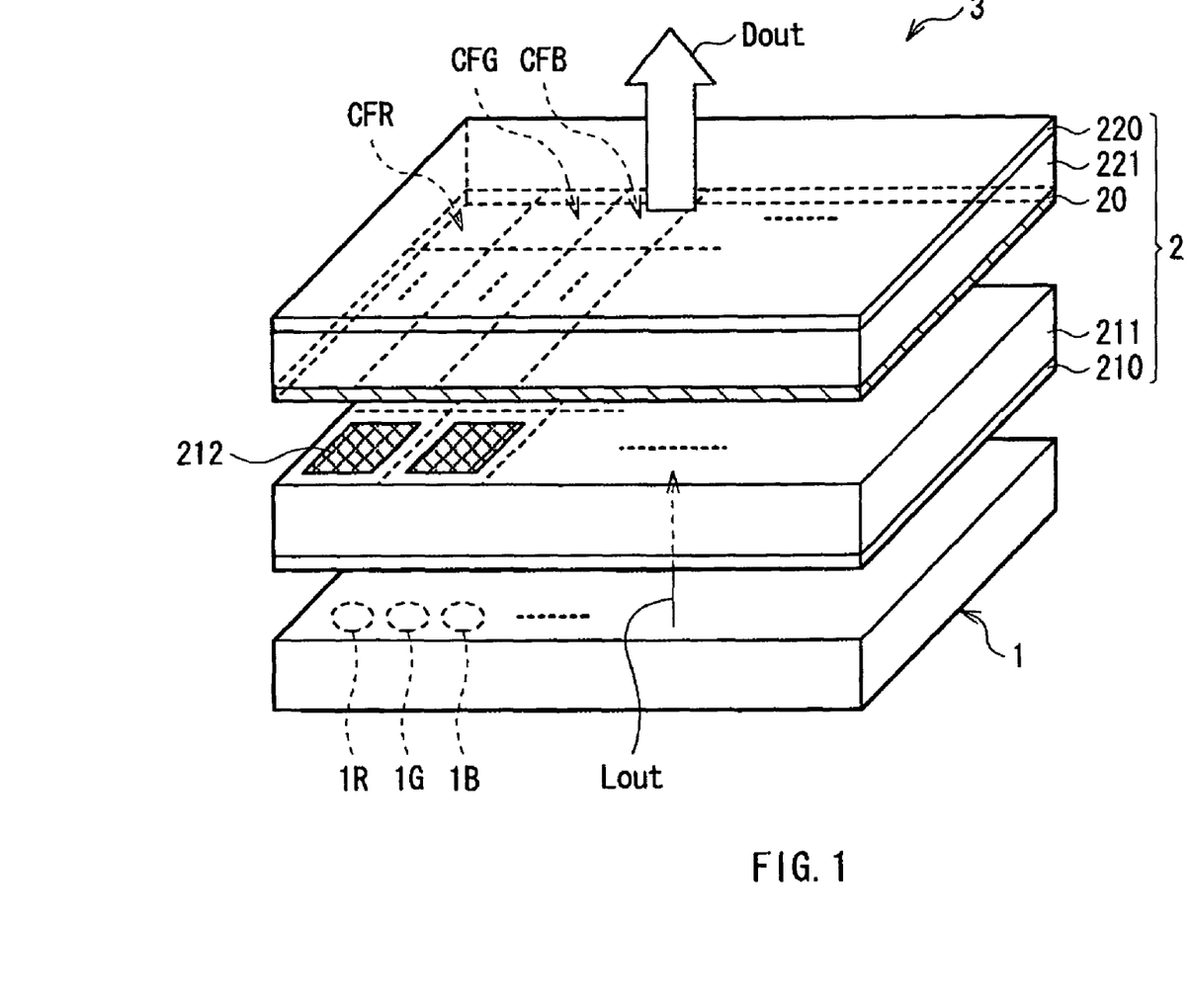
FIG. 1 is a perspective view showing the whole configuration of an image display system (a liquid crystal display) according to an embodiment of the invention.

FIG. 1 shows the whole configuration of an image display system (a liquid crystal display 3) according to an embodiment of the invention. The liquid crystal display 3 is a so-called transmissive liquid crystal display emitting transmitted light as display light Dout, and includes a backlight system 1 as a light source device according to an embodiment of the invention and a transmissive liquid crystal display panel 2. A method of displaying an image according to an embodiment of the invention is embodied by an image display system according to the embodiment, and will be also described below.

The liquid crystal display panel 2 includes a transmissive liquid crystal layer 20, a pair of substrates between which the liquid crystal layer 20 is sandwiched, that is, a TFT (Thin Film Transistor) substrate 211 as a substrate on a side closer to the backlight system 1 and a facing electrode substrate 221 as a substrate facing the TFT substrate 211, and polarizing plates 210 and 220 laminated on a side of the TFT substrate 211 and a side of the facing electrode substrate 221 opposite to sides closer to the liquid crystal layer 20, respectively.

Moreover, the TFT substrate 211 includes pixels in a matrix form, and in each pixel, a pixel electrode 212 including a driving device such as a TFT is formed.

The backlight system 1 is a color mixing type backlight system obtaining illumination light Lout as specific color light by mixing a plurality of color light beams (in this case, red light, green light and blue light). The backlight system 1 includes a light source (a light source 10 which will be described later) including a plurality of red LEDs 1R, a plurality of green LEDs 1G and a plurality of blue LEDs 1B as three kinds of light sources emitting different color light beams.

Figure 2A:
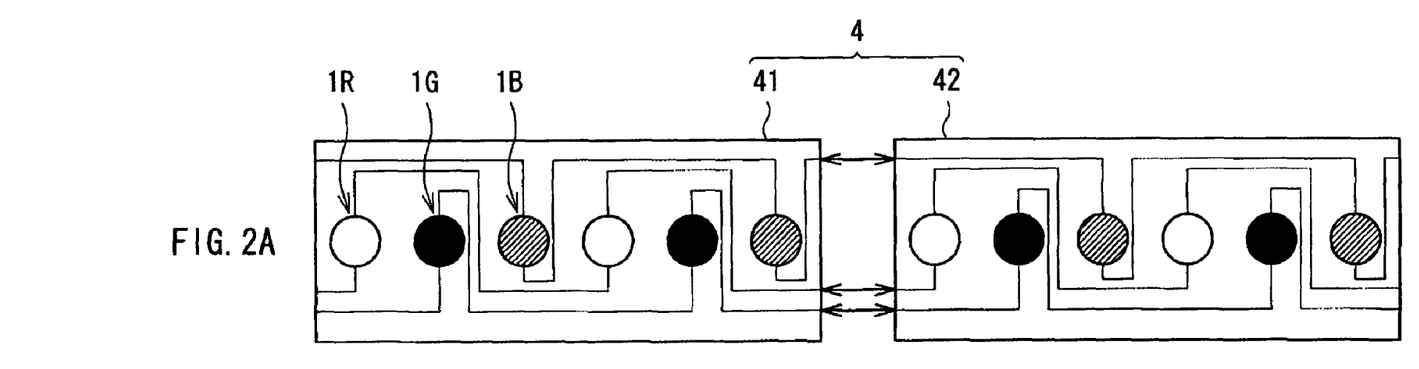
FIGS. 2A and 2B are schematic plan views showing a configuration example of a unit (a lighting section) of a light source in a backlight system shown in FIG. 1.
Figure 2B:
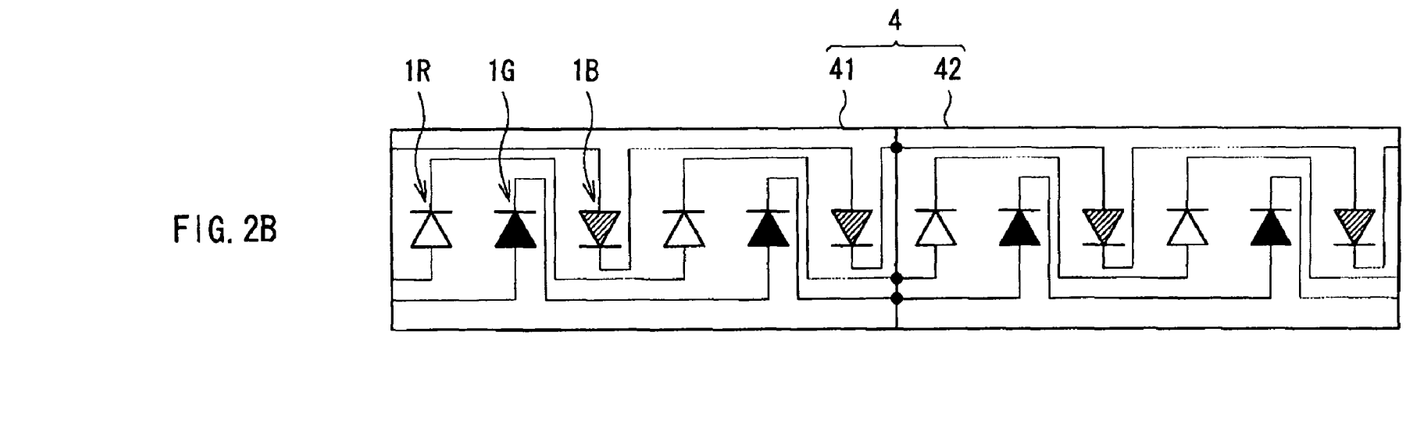
Figure 3:
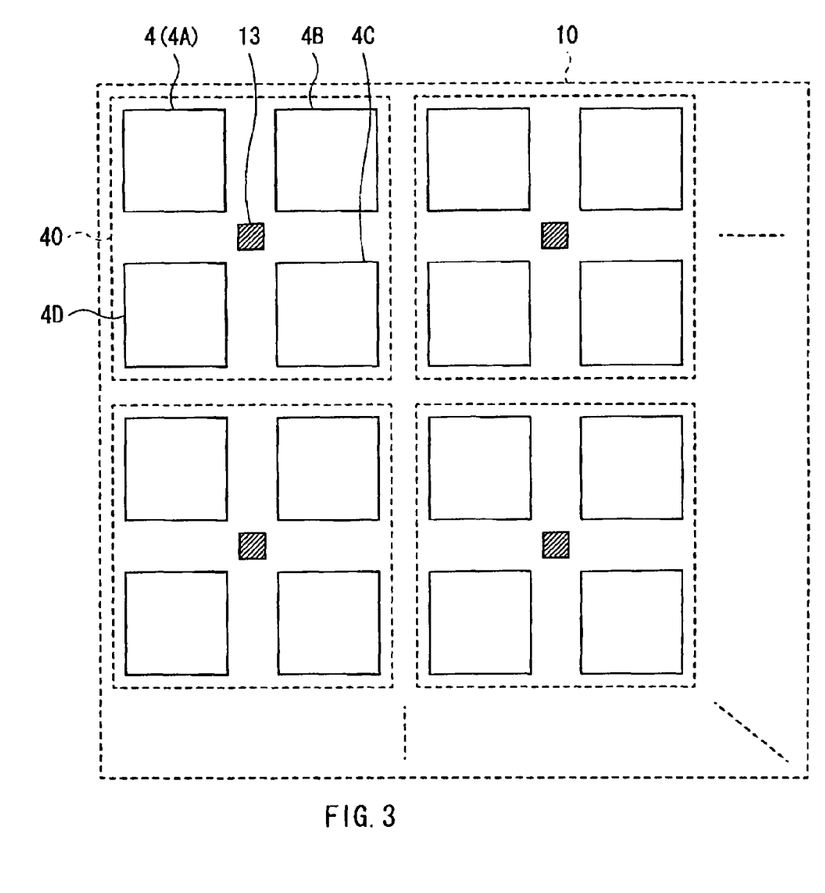
FIG. 3 is a schematic plan view showing an arrangement example of the lighting section and an illumination light sensor in the light source shown in FIGS. 2A and 2B.

FIGS. 2A, 2B and 3 show an example of the arrangement of each LED in the backlight system 1.

As shown in FIG. 2A, in the backlight system 1, a pair of red LEDs 1R, a pair of green LEDs 1G and a pair of blue LEDs 1B constitute each of unit cells 41 and 42 in a light emitting section, and two unit cells 41 and 42 constitute a lighting section 4 as a unit of the light emitting section. Moreover, LEDs of each color are serially connected to one another in each unit cell and between the unit cells 41 and 42.

More specifically, as shown in FIG. 2B, an anode of an LED of each color is connected to a cathode of another LED of the same color.

For example, as shown in FIG. 3, the lighting sections 4 with such a configuration are arranged in a matrix form in the light source 10, and as will be described later, the lighting sections 4 are controllable independently of one another. Moreover, on the light source 10, one illumination light sensor 13 is arranged for four lighting sections 4 (for example, lighting sections 4A to 4D). Although details will be described later, the illumination light sensor 13 detects light (illumination light Lout which will be described later) from the lighting sections 4, and is able to detect light from a region (a detection region 40) corresponding to a region where four lighting sections 4 are arranged.

Figure 4:
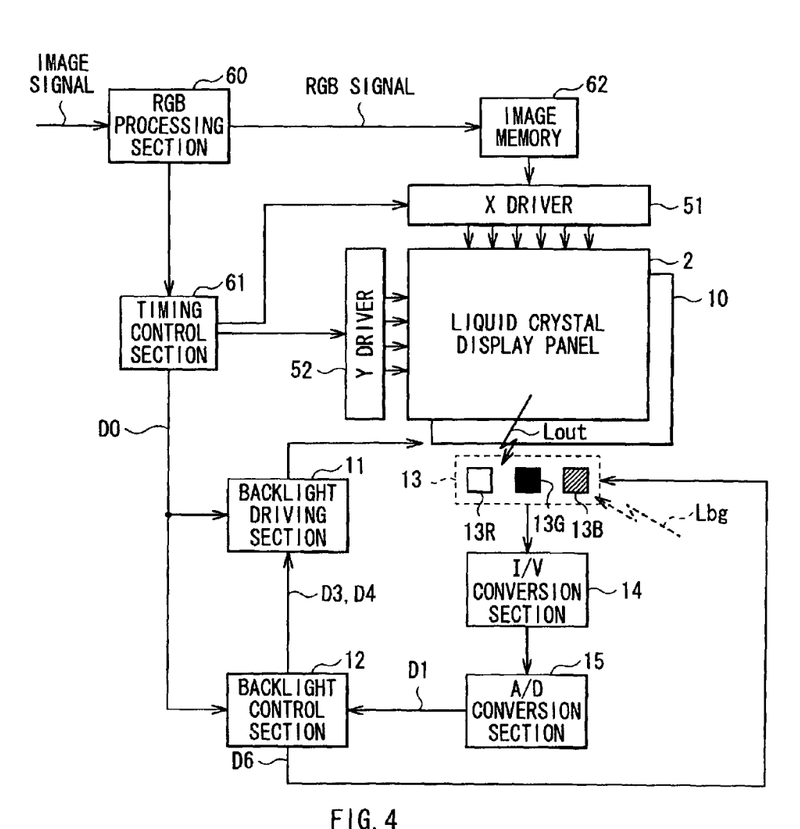
FIG. 4 is a block diagram showing the whole configuration of the liquid crystal display shown in FIG. 1.

Next, referring to FIG. 4, the configurations of driving and control sections of the above-described liquid crystal display panel 2 and the above-described light source 10 will be described in detail below. FIG. 4 shows a block diagram of the liquid crystal display 3. In FIG. 4 (and FIG. 5 which will be described later), for the sake of convenience, only one illumination light sensor 13 is arranged near the light source 10.

As shown in FIG. 4, a driving circuit for displaying an image by driving the liquid crystal display panel 2 includes an X driver (data driver) 51 supplying a drive voltage on the basis of an image signal to each pixel electrode 212 in the liquid crystal display panel 2, a Y driver (gate driver) 52 line-sequentially driving the pixel electrodes 212 in the liquid crystal panel 2 along a scanning line (not shown), a timing control section (a timing generator) 61 controlling the X driver 51 and the Y driver 52, an RGB processing section (a signal generator) 60 generating an RGB signal by processing an image signal from outside, and an image memory 62 as a frame memory storing the RGB signal from the RGB processing section 60.

On the other hand, a section driving and controlling the light source 10 to perform the lighting operation of the backlight system 1 includes a backlight driving section 11, a backlight control section 12, an illumination light sensor 13, an I/V conversion section 14 and an A/D conversion section 15.

The illumination light sensor 13 obtains a light reception signal by receiving the illumination light Lout from the light source 10 (more specifically, as described above, the lighting sections 4 in each detection region 40), and includes a red light sensor 13R selectively extracting and receiving red light from mixed color light produced by mixing a plurality of color light beams (in this case, red light, green light and blue light), a green light sensor 13G selectively extracting and receiving green light from the mixed color light, and a blue light sensor 13B selectively extracting and receiving blue light from the mixed color light.

Moreover, as will be described in detail later, the light reception signal (a light amount) detected by the illumination light sensor 13 includes, for example, a light amount component (a background component) resulting from background light Lbg by environment light including infrared light or an electrical offset component of a light-sensing circuit section (circuit sections of the illumination light sensor 13, the I/V conversion section 14 and the A/D conversion section 15) in addition to a light amount component resulting from the above-described illumination light Lout. Switching between light reception modes is controlled on the basis of a control signal (control data) D6 supplied from the backlight control section 12 to the illumination light sensor 13. The specific configuration of the illumination light sensor 13 and the control of switching between light reception modes will be described later.

The I/V conversion section 14 performs I/V (current/voltage) conversion on a light reception signal of each color obtained by the illumination light sensor 13 so as to output light reception data of each color as an analog voltage signal. The specific configuration of the I/V conversion section 14 will be described later (refer to FIG. 6).

The A/D conversion section 15 samples the light reception data of each color outputted from the I/V conversion section 14 at a predetermined timing, and performs A/D (analog/digital) conversion on the light reception data of each color to output light reception data D1 of each color as a digital voltage signal to the backlight control section 12.

The backlight control section 12 generates and outputs control signals D3 and D4 which will be described later on the basis of the light reception data D1 of each color supplied from the A/D conversion section 15, and a control signal (control data) D0 supplied from the timing control section 61 so as to control the driving operation of the backlight driving section 11. The specific configuration of the backlight control section 12 will be described later (refer to FIG. 5).

The backlight driving section 11 drives the light source 10 to perform the lighting operation of each lighting section in a time division manner on the basis of the control signal D3 and D4 supplied from the backlight control section 12 and the control signal D0 supplied from the timing control section 61. The specific configuration of the backlight driving section 11 will be described later (refer to FIG. 5).

Figure 5:
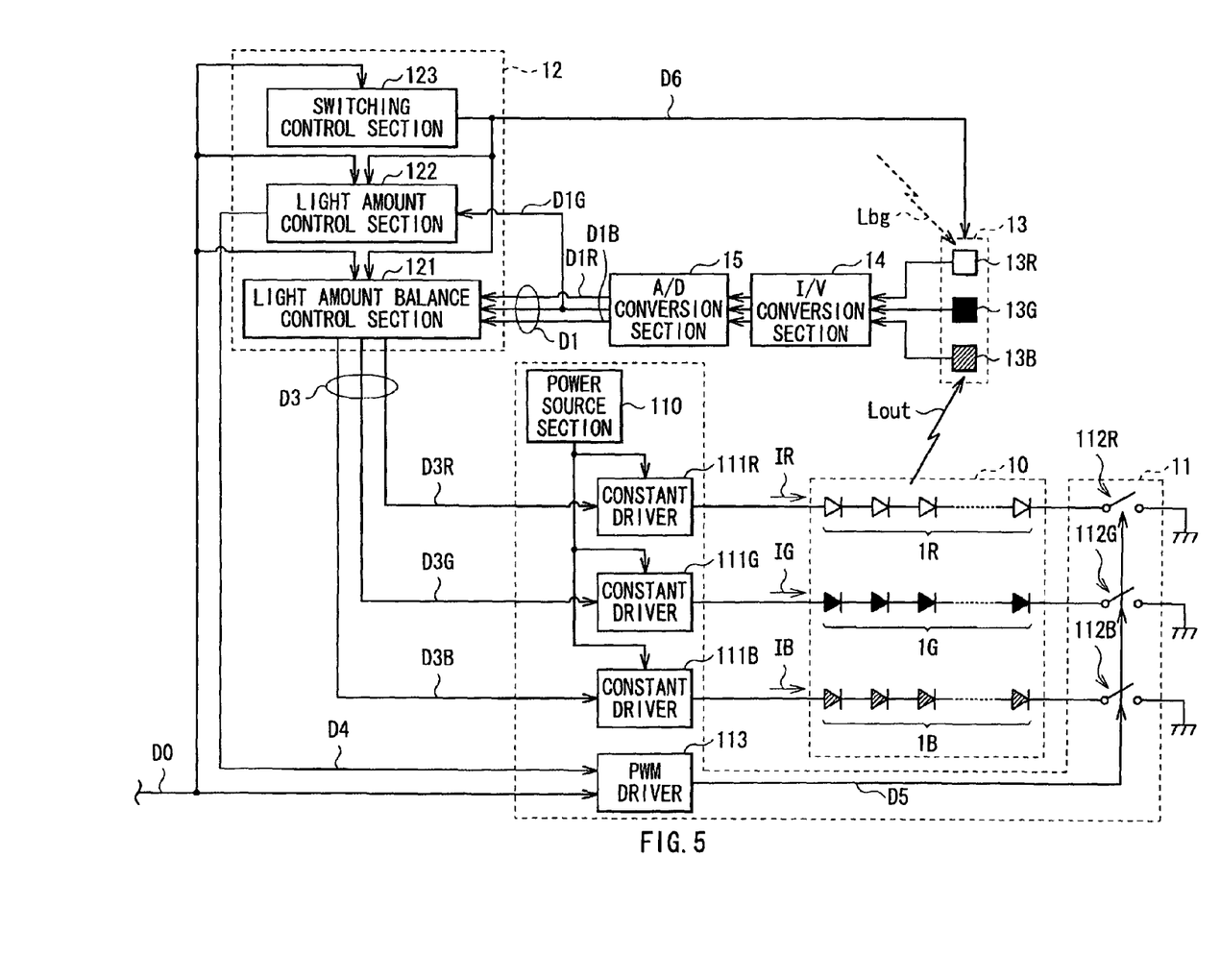
FIG. 5 is a block diagram showing specific configurations of driving and control sections of the light source shown in FIG. 4.
Figure 6:
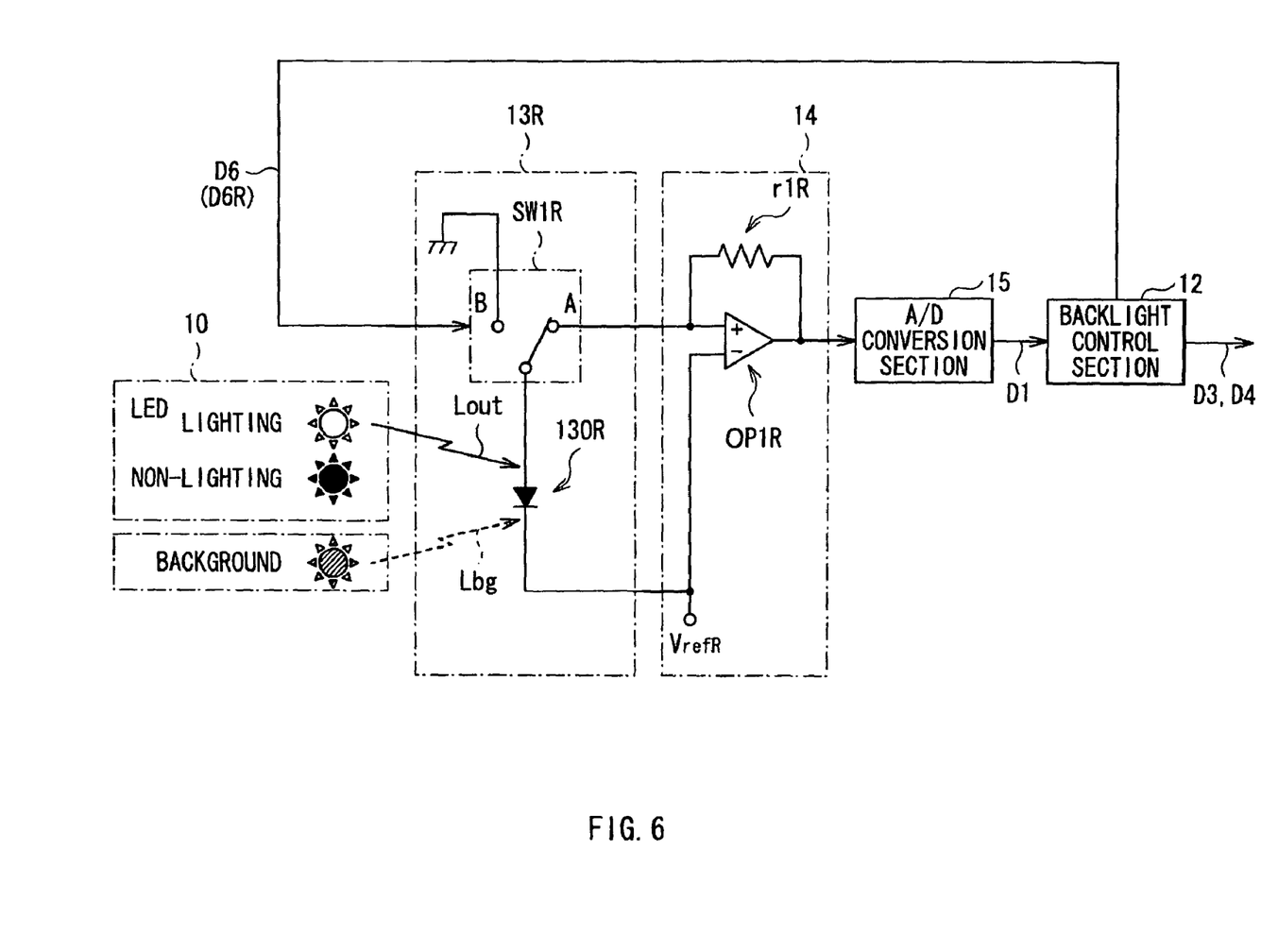
FIG. 6 is a circuit diagram and a block diagram showing specific configurations of a red light sensor, an I/V conversion section, an A/D conversion section and a backlight control section shown in FIG. 5.

Next, referring to FIGS. 5 and 6, the specific configurations of the above-described backlight driving section 11 and the backlight control section 12 will be described below. FIG. 5 shows a block diagram of the specific configurations of the backlight driving section 11 and the backlight control section 12, and the configurations of the light source 10, the illumination light sensor 13, the I/V conversion section 14 and the A/D conversion section 15. Moreover, FIG. 6 shows the specific configurations of the illumination light sensor 13 (the red light sensor 13R), the I/V conversion section 14, the A/D conversion section 15 and the backlight control section 12 shown in FIG. 5 specifically relating to only the red LED 1R. The light reception data D1 includes red light reception data D1R, green light reception data D1G and blue light reception data D1B, and the control signal D3 includes a red control signal D3R, a green control signal D3G and a blue control signal D3B, and the control signal D4 includes a red control signal D4R, a green control signal D4G and a blue control signal D4B, and the control signal D6 includes a red control signal D6R, a green control signal D6G and a blue control signal D6B. In this case, for the sake of convenience, the case where the red LED 1R, the green LED 1G and the blue LED 1B are serially connected to one another in the light source 10 is shown.

As shown in FIG. 5, the backlight driving section 11 includes a power source section 110, constant current drivers 111R, 111G and 111B supplying currents IR, IG and IB to the anodes of the red LED 1R, the green LED 1G and the blue LED 1B, respectively, in the light source 10 by power supplied from the power source section 110 on the basis of the control signal D3 (the red control signal D3R, the green control signal D3R and the blue control signal D3B) supplied from the backlight control section 12, switching devices 112R, 112G and 112B connected between the cathodes of the red LED 1R, the green LED 1G and the blue LED 1B and the ground, respectively, and a PWM driver 113 generating and outputting control signals D5 (pulse signals) for the switching devices 112R, 112G and 112B on the basis of the control signal D4 supplied from the backlight control section 12 and the control signal D0 supplied from the timing control section 61 to perform PWM control on the switching devices 112R, 112G and 112B, respectively. The switching devices 112R, 112G and 112B each include, for example, a transistor such as an MOS-FET (Metal Oxide Semiconductor-Field Emission Transistor), or the like.

Further, the backlight control section 12 includes a light amount balance control section 121, a light amount control section 122 and a switching control section 123.

The light amount balance control section 121 generates and outputs the control signals D3 (the red control signal D3R, the green control signal D3G and the blue control signal D3B) for the constant-current drivers 111R, 111G and 111B on the basis of the light reception data D1 (the red light reception data D1R, the green light reception data D1G and the blue light reception data D1B) supplied from the A/D conversion section 15 and the control signal D0 supplied from the timing control section 61, thereby the light amount balance control section 121 changes currents (light emission currents) IR, IG and IB flowing through the red LED 1R, the green LED 1G and the blue LED 1B, respectively, to change light emission intensity of the LEDs, thereby the light amount balance control section 121 controls the color balance (the color temperature) of the illumination light Lout from the light source 10 depending on a setting value.

The light amount control section 122 changes the light emission durations (lighting durations) of the red LED 1R, the green LED 1G and the blue LED 1B by generating and outputting the control signal D4 for the PWM driver 113 on the basis of the green light reception data D1G of the light reception data D1 supplied from the A/D conversion section 5 and the control signal D0 supplied from the timing control section 61, thereby the light amount control section 122 controls the light emission amount (light emission intensity) of the illumination light Lout from the light source 10. In this case, only the control signal D1G of the control signals D1R, D1G and D1B is inputted, because human eyes have the highest spectral sensitivity for green light, and other control signals D1R and D1B may be inputted.

Moreover, the light amount balance control section 121 and the light amount control section 122 calculate a net light amount by subtracting a measurement environment component (in this case, the above-described background component and the above-described electrical offset component) which is independent of a lighting state in the light source 10 from a light reception signal (a light amount) detected by the illumination light sensor 13 by using light reception results obtained in a plurality of different light reception modes (which will be described in detail later) performed by utilizing the illumination light sensor 13, thereby the light source 10 is controlled by the calculated light reception signal (the net light amount) obtained by subtracting the measurement environment component from the light reception signal (the light amount) detected by the illumination light sensor 13. More specifically, the light amount balance control section 121 and the light amount control section 122 also calculate the above-described background component, and in the case where the calculated background component is equal to or more than a predetermined threshold, the feedback control of the light source 10 by using the light reception results obtained by the illumination light sensor 13 is suspended for a certain period (for example, 1 frame period).

The switching control section 123 generates control signals D6 (a red control signal D6R, a green control signal D6G and a blue control signal D6B) for controlling switching between a plurality of light reception modes which will be described below on the basis of the control signal D0 supplied from the timing control section 61, and outputs the control signals D6 to the illumination light sensor 13, the light amount balance control section 121 and the light amount control section 122, thereby the switching control section 123 controls switching between the plurality of light reception modes. As such a plurality of light reception modes, in the embodiment, the following three light reception modes are established. Such control of switching between the light reception modes will be described in detail later.

(A) A first light detection mode allowing a first detection light amount to be obtained, by turning the light source 10 into a lighting state and turning the light detection function of the illumination light sensor 13 into an active state, the first detection light amount being a sum of an original light amount component (an A/D component D10 which will be described later) resulting from the illumination light Lout from the light source 10, a background component (an A/D component Dbg which will be described later) of the background light Lbg and an electrical offset component (an A/D component Dos which will be described later).

(B) A second light detection mode allowing a second detection light amount to be obtained, by turning the light source 10 into a non-lighting state and turning the light detection function of the illumination light sensor 13 into the active state, the second detection light amount being a sum of the background component (the A/D component Dbg) of the background light Lbg and the electrical offset component (the A/D component Dos).

(C) A third light detection mode allowing the electrical offset component (the A/D component Dos) to be obtained by turning the light source 10 into a non-lighting state and turning the light detection function of the illumination light sensor 13 into an inactive state.

Next, as shown in FIG. 6, the red light sensor 13R of the illumination light sensor 13 includes a light sensor 130R receiving the illumination light Lout and the background light Lbg and a switching device SW1R for switching connection between the light sensor 130R and one of connection points A and B on the basis of the control signal D6R. The light sensor 130R is made of, for example, a photodiode, and an anode of the light sensor 130R is connected to an end of the switching device SW1R, and a cathode of the light sensor 130R is connected to a reference light source VrefR. Moreover, the other end of the switching device SW1R is connected to one of the connection points A and B, and the connection point A is connected to a positive input terminal of an operational amplifier OP1R which will be described later, and the connection point B is connected to the ground. The green light sensor 13G and the blue light sensor 13B (both not shown) of the illumination light sensor 13 have the same configuration as the red light sensor 13R.

As the illumination light sensor 13 has such a configuration, on the basis of the control signal D6R or the like, the light reception function of the light sensor 130R or the like is switched between an active state and an inactive state. More specifically, in the case where the other end of the switching device SW1R or the like is connected to the connection point A, the light reception function of the light sensor 130R or the like is turned into the active state, but on the other hand, in the case where the other end of the switching device SW1R or the like is connected to the connection point B, the light reception function of the light sensor 130R is turned into the inactive state.

A section relating to the red LED 1R of the I/V conversion section 14 includes the operational amplifier OP1R and a resistor r1R. The positive input terminal of the operational amplifier OP1R is connected to the connection point A and an end of the resistor r1R, and the negative input terminal of the operational amplifier OP1R is connected to the reference light source VrefR and the cathode of the light sensor 130R, and the output terminal is connected to the other end of the resistor r1R and the input terminal of the A/D conversion section 15. Sections (not shown) relating to the blue LED 1B and the green LED 1G of the I/V conversion section 14 have the same configuration as the section relating to the red LED 1R.

The backlight control section 12 corresponds to a specific example of "a light source control means" in the invention. The liquid crystal display panel 2 corresponds to a specific example of "a display section" in the invention. The light amount balance control section 121 and the light amount control section 122 correspond to specific examples of "a light source control means" and "a calculation means" in the invention.

Next, the operations of the backlight system 1 with such a configuration and the liquid crystal display 3 according to the embodiment will be described in detail below.

Figure 7:
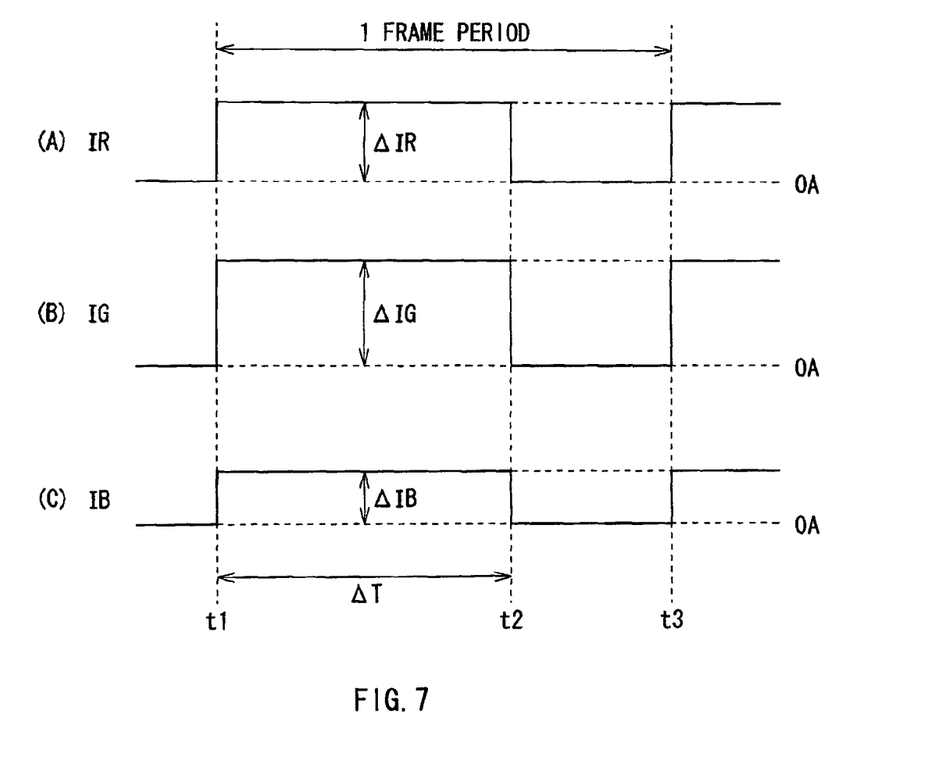
FIG. 7 is a timing waveform chart for describing a drive pulse signal of the light source.
Figure 8:
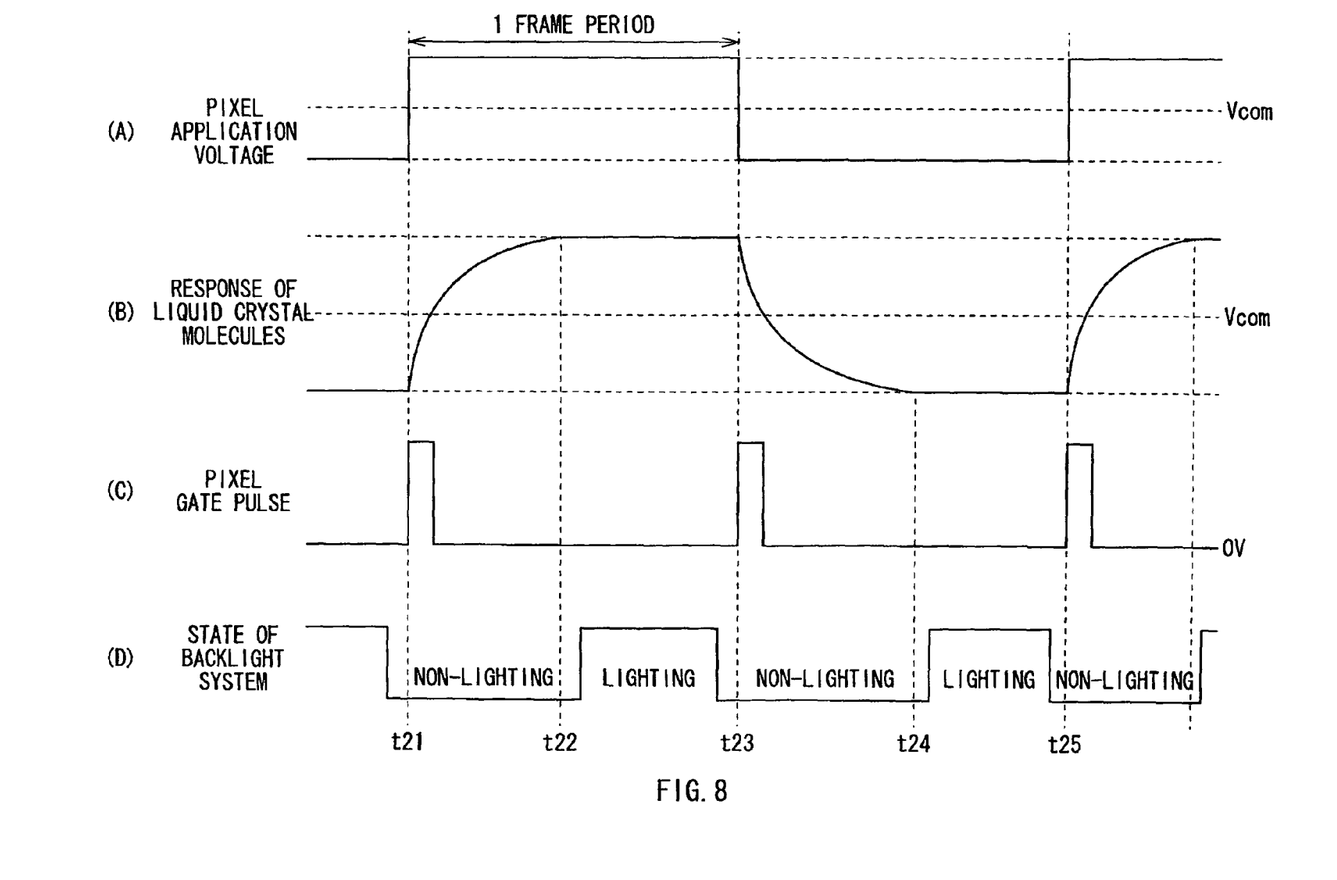
FIG. 8 is a timing waveform chart for describing an example of a method of driving a liquid crystal display panel and the backlight system shown in FIG. 1.

At first, referring to FIGS. 1 to 9, the basic operations of the backlight system 1 and the liquid crystal display 3 according to the embodiment will be described below. FIG. 7 shows a timing waveform chart showing the lighting operation in the light source 10 of the backlight system 1, and (A) shows a current (light emission current) IR flowing through the red LED 1R, (B) shows a current IG flowing through the green LED 1G, and (C) shows a current IB flowing through the blue LED 1B. Moreover, FIG. 8 shows a timing waveform chart briefly showing the operation of the whole liquid crystal display 3, and (A) shows a voltage (a pixel application voltage, a drive voltage) applied from the X driver 51 to each pixel electrode 212 in the liquid crystal panel 2, (B) shows the response of liquid crystal molecules (an actual potential state in the pixel electrode 212) and (C) shows a voltage (a pixel gate pulse) applied from the Y driver 52 to the gate of a TFT device in the liquid crystal panel 2.

In the backlight system 1, when the switching devices 112R, 112G and 112B in the backlight driving section 11 turns into an on state, the currents (light emission currents) IR, IG and IB flow from the constant current drivers 111R, 111G and 111B to the red LEDs 1R, the green LEDs 1G and the blue LEDs 1B in the light source 10, respectively, by power supply from the power source section 110, thereby red light, green light and blue light are emitted so as to emit the illumination light Lout as mixed color light.

At this time, the control signal D0 is supplied from the timing control section 61 to the backlight driving section 11, and the control signals D5 on the basis of the control signal D0 are supplied from the PWM driver 113 in the backlight driving section 11 to the switching devices 112R, 112G and 112B, thereby the switching devices 112R, 112G and 112B are turned into an on state at a timing in synchronization with the control signal D0, and the lighting durations of the red LEDs 1R, the green LEDs 1G and the blue LEDs 1B synchronize with the control signal D0. In other words, the red LED 1R, the green LED 1G and the blue LED 1B are PWM-driven by time-division drive using the control signals D5 as pulse signals.

Moreover, at this time, the illumination light sensor 13 detects the illumination light Lout (and the background light Lbg which will be described later) from the light source 10. More specifically, in the red light sensor 13R, the green light sensor 13G and the blue light sensor 13B in the illumination light sensor 13, a photodiode of each color extracts each color light from the illumination light Lout from the light source 10, and a current according to the light amount of each color light is generated, thereby the light reception data of the current value is supplied to the I/V conversion section 14. Further, the light reception data of the current value of each color is converted into light reception data of an analog voltage value by the I/V conversion section 14. Then, the light reception data of the analog voltage value of each color is sampled at a predetermined timing in the A/D conversion section 15, and is converted into light reception data D1R, D1G or D1B (an A/D value of a light sensor which will be described later) of a digital voltage value.

In this case, in the backlight control section 12, on the basis of the light reception data D1R, D1G and D1B for each color supplied from the A/D conversion section 15, the control signals D3R, D3G and D3B are supplied from the light amount balance control section 121 to the constant-current drivers 111R, 111G and 111B, respectively, thereby the magnitudes ΔIR, ΔIG and ΔIB of the currents IR, IG and IB, that is, the light emission intensities of the LEDs 1R, 1G and 1B are adjusted so as to keep the chromaticity (color temperature, color balance) of the illumination light Lout constant (refer to FIG. 7(A) to (C)).

Moreover, in the light amount control section 122, the control signal D4 is generated on the basis of the light reception data DIG of the light reception data D1R, D1G and D1B for each color supplied from the A/D conversion section 15, and is supplied to the PWM driver 113, thereby the on durations of the switching devices 112R, 112G and 112B, that is, the lighting durations ΔT of the LEDs 1R, 1G and 1B are adjusted (refer to FIG. 7(A) to (C)).

Thus, on the basis of the illumination light Lout from the light source 10, the magnitudes ΔIR, ΔIG and ΔIB of the currents IR, IG and IB (the light emission intensities of the LEDs 1R, 1G and 1B) and the lighting durations are controlled, thereby the light emission amount (light emission intensity) of the illumination light Lout of each lighting section 4 is controlled.

On the other hand, in the whole liquid crystal display 3 according to the embodiment, the illumination light Lout from the light source 10 of the backlight system 1 is modulated in a liquid crystal layer 20 by drive voltages (pixel application voltages) outputted from the X driver 51 and the Y driver 52 to the pixel electrodes 212 on the basis of an image signal, and the modulated illumination light Lout is outputted from the liquid crystal panel 2 as display light Dout. Thus, the backlight system 1 functions as a backlight (a light source device for liquid crystal) of the liquid crystal display 3, thereby an image is displayed by the display light Dout.

More specifically, for example, as shown in FIG. 8(C), a pixel gate pulse is applied from the Y driver 52 to the gates of the TFT devices on one horizontal line in the liquid crystal panel 2, and at the same time, as shown in FIG. 8(A), a pixel application voltage on the basis of the image signal is applied from the X driver 51 to the pixel electrodes 212 on the one horizontal line. At this time, as shown in FIG. 8(B), the response of the actual potential of the pixel electrodes 212 relative to a pixel application voltage (response of liquid crystal molecules) is delayed (while the pixel application voltage starts at a timing t21, the actual potential starts at a timing t12), and the backlight system 1 turns into a lighting state in a period from timings t22 to t23 in which the actual potential is equal to the pixel application voltage (refer to FIG. 8(D)), thereby an image on the basis of the image signal is displayed on the liquid crystal display 3. In FIG. 8, the period from the timing t21 to t23 corresponds to one horizontal period (one frame period), and in the next horizontal period from the timings t23 to t25, the same operation as that in one horizontal period from the timings t21 to t23 is performed, except that the pixel application voltage is inverted relative to a common potential Vcom to prevent burn-in on the liquid crystal display or the like.

Figure 9:
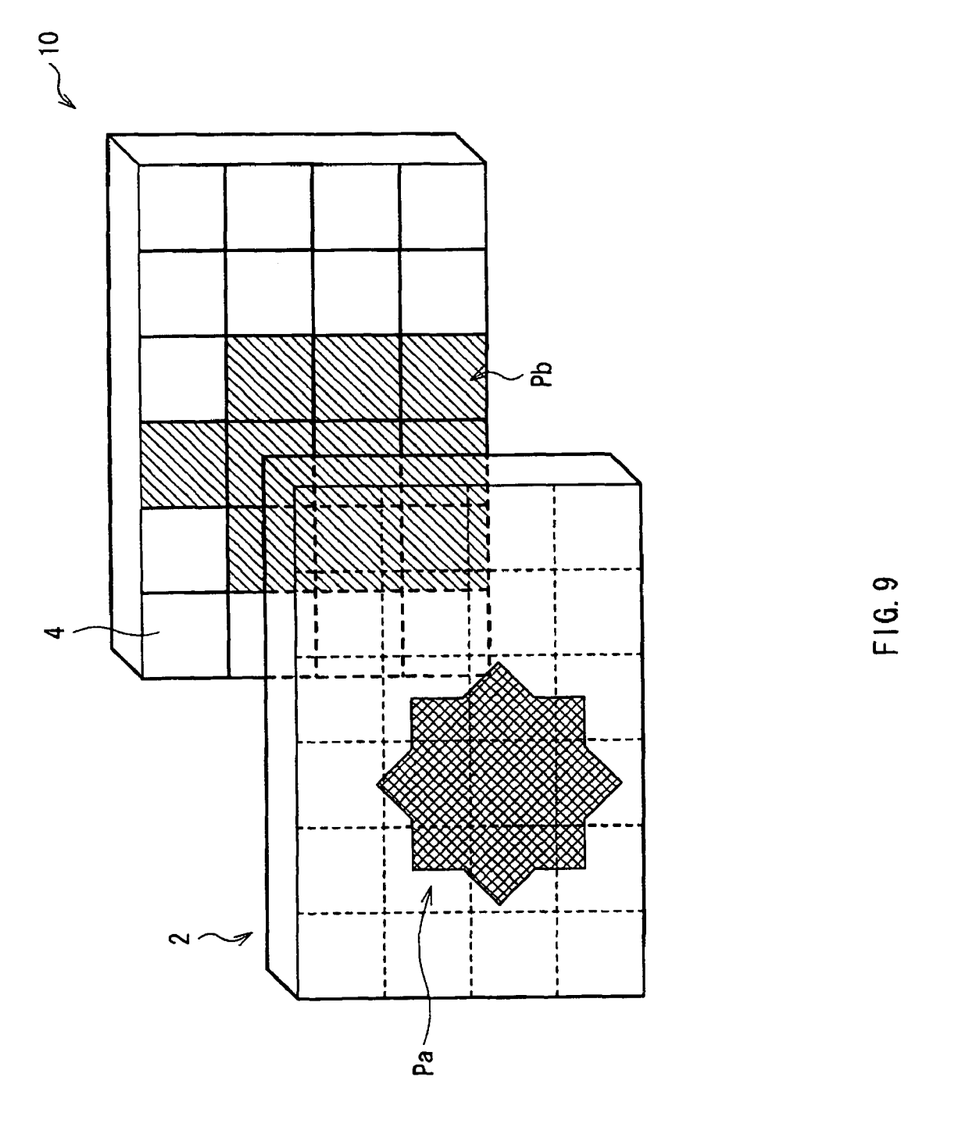
FIG. 9 is a perspective view for describing an example of an arrangement relationship between an image display region and a partial lighting region.

Moreover, in the liquid crystal display 3, the control signal D0 is supplied from the timing control section 61 to the PWM driver 113 in the backlight driving section 11 through the use of a signal (a signal on the basis of the image signal) supplied from the RGB processing section 60; therefore, for example, as shown in FIG. 9, in the light source 10, only lighting sections 4 in a region corresponding to an image display region (a region where an display image Pa is displayed) having a predetermined luminance or higher of an image display region in the liquid crystal display panel 2 illuminate, thereby the operation of forming a partial lighting region Pb becomes possible.

Next, referring to FIGS. 10 and 11 in addition to FIGS. 1 to 9, the control operation as a characteristic part of the embodiment of the invention will be described in detail below.

Figure 10:
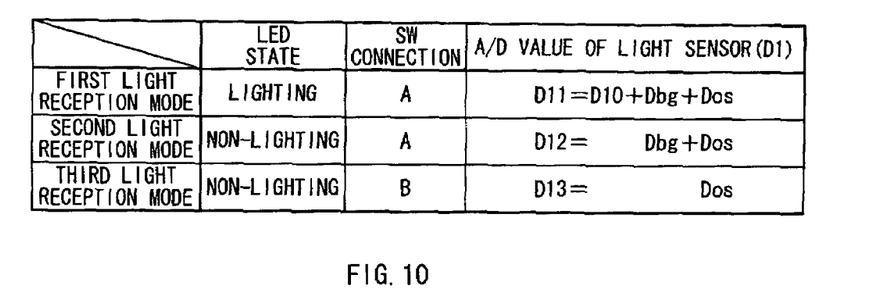
FIG. 10 is an illustration for describing a switching process of light reception operation according to the embodiment.

At first, in the backlight system 1 according to the embodiment, switching between three light reception modes (first to third light reception modes) shown in FIG. 10 is controlled on the basis of the control signal D6 supplied from the switching control section 123. More specifically, in the first light reception mode, the light source 10 (an LED state) is in a lighting state, and the light reception function of the illumination light sensor 13 is in an active state (the switching device SW1R or the like is connected to the connection point A). In the second light reception mode, the light source 10 is in a non-lighting state, and the light reception function of the illumination light sensor 13 is in an active state. In the third light reception mode, the light source 10 is in a non-lighting state, and the light reception function of the illumination light sensor 13 is in an inactive state (the switching device SW1R or the like is connected to the connection point B). Thereby, in the first light reception mode, the light reception data (the A/D value of the light sensor) D11 after being detected by the illumination light sensor 13, and I/V-converted and A/D-converted includes the original light amount component (the A/D component D10) resulting from the illumination light Lout from the light source 10, the background component (the A/D component Dbg) of the background light Lbg and the electrical offset component (the A/D component Dos). In the second light reception mode, the light reception data (the A/D value of the light sensor) D12 includes the A/D component Dbg and the A/D component Dos. In the third light reception mode, the light reception data (the A/D value of the light sensor) D13 includes only the A/D component Dos.

Figure 11:
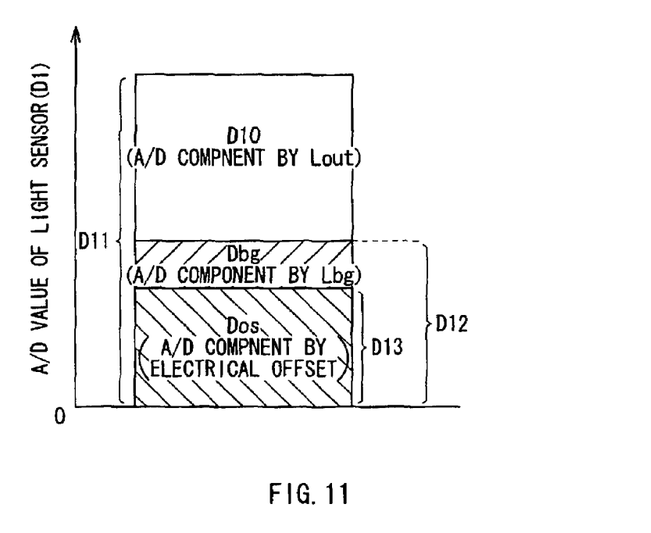
FIG. 11 is an illustration for describing an A/D value of a light sensor shown in FIG. 10.

Therefore, as shown in FIGS. 10 and 11, in the light amount balance control section 121 and the light amount control section 122, a difference between the light reception result (the light reception data D11) in the first light reception mode and the light reception result (the light reception data D12) in the second light reception mode is obtained, thereby the net light amount by subtracting the measurement environment component (the background component (the A/D component Dbg) and the electrical offset component (the A/D component Dos)) from the light reception signal (the light amount) detected by the illumination light sensor 13, that is, the original light amount component (the A/D component D10) resulting from the illumination light Lout from the light source 10 is calculated, and a difference between the light reception result (the light reception data D12) in the second light reception mode and the light reception result (the light reception data D13) in the third light reception mode is obtained, thereby the background component (the A/D component Dbg) of an external component is calculated.

Thereby, in the light amount balance control section 121 and the light amount control section 122, in consideration of these measurement environment components, the light source 10 is controllable on the basis of the light amount component D10 (the original light amount component) resulting from the illumination light Lout from the light source 10. More specifically, the light source 10 is controllable through the use of the light reception data (the net light amount) D10 by subtracting the measurement environment components (the A/D component Dbg and the A/D component Dos) from the light reception signal (the light amount) D11 detected by the illumination light sensor 13. Moreover, in the case where the calculated background component A/D component Dbg is equal to or more than a predetermined threshold, the feedback control of the light source 10 by using the light reception results obtained by the illumination light sensor 13 is able to be suspended for a certain period (for example, one frame period).

As described above, in the embodiment, the light reception data (the net light amount) D10 by subtracting the measurement environment components (the A/D component Dbg and the A/D component Dos) from the light reception signal (the light amount) D11 detected by the illumination light sensor 13 is calculated through the use of the light reception results (the light reception signals D11, D12 and D13) in a plurality of (three in this case) light reception modes performed by utilizing the illumination light sensor 13, so the control of the light source 10 in consideration of such measurement environment components is able to be performed. Moreover, it is not necessary to add, for example, a member such as an infrared filter, so manufacturing costs are not increased. Therefore, while keeping manufacturing costs low, the light emission amount of the light source 10 is controllable more accurately.

Moreover, in the case where the calculated background component (the A/D component Dbg) is equal to or more than a predetermined threshold, the feedback control of the light source 10 by using the light reception results obtained by the illumination light sensor 13 is suspended for a certain period, so even if the range of temporal variation in the background component is large due to an influence such as an infrared ray emitted from a remote control of a TV, hindrance to the proper feedback control is avoidable.

Further, such a backlight system 1 is used as a backlight (a light source device for liquid crystal) of the liquid crystal display 3, so unevenness in luminance, color or the like is able to be reduced in the whole liquid crystal display 3.

Although the present invention is described referring to the embodiment, the invention is not limited to the embodiment, and may be variously modified.

For example, in the above-described embodiment, the case where the external component includes the background component and the electrical offset component, and switching between three light reception modes is controlled is described; however, the number of the light reception modes between which switching is controlled is not limited to three, and switching between two light reception modes may be controlled. More specifically, the switching control section 123 may control switching between a first light reception mode allowing a sum of the original light amount component resulting from light from the light source 10 and the external component to be obtained by turning the light source 10 into a lighting state by the switching control section 123 and turning the light reception function of the illumination light sensor 13 into an active state, and a second light reception mode allowing only the external component to be obtained by turning the light source 10 into a non-lighting state and turning the light reception function of the illumination light sensor 13 into an active state.

Moreover, in the above-described embodiment, the case where four lighting sections 4 are arranged in one detection region 40 is described; however, the number of the lighting sections 4 is not limited to four. Further, in the above-described embodiment, the case where all of four lighting sections 4 illuminate in the whole lighting duration Δt4, and only one lighting section 4 illuminates in a partial lighting duration Δt1 is described; however, the invention is not limited to the case, and it is only necessary for the number of lighting sections illuminating in the whole lighting duration to be larger than the number of the lighting sections 4 illuminating in the partial lighting duration.

Further, in the above-described embodiment, the case where the luminance and the color temperature of the light source is controlled by changing at least one of the lighting duration and the light emission intensity of each LED is described; however, at least one of the luminance and the color temperature of the light source may be controlled by changing at least one of the lighting duration and the light emission intensity of each LED.

In the above-described embodiment, the case where the light source 10 includes a plurality of lighting sections 4 controllable independently of one another, and the reception of the illumination light Lout from the light source 10, the control of the light source 10, the calculation of the external component, and the control of switching between a plurality of light reception modes are performed in each lighting section 4 (the case of the partial drive of the backlight system) is described; however, the invention is not limited to the case of such partial drive, and is applicable to the case where the whole light source is driven and controlled collectively.

In the above-described embodiment, the case where the red LED 1R, the green LED 1G and the blue LED 1B are contained in separate packages is described; however, for example, LEDs of a plurality of colors may be contained in one package.

In the above-described embodiment, the case where the illumination light sensor 13 includes light sensors of three colors, that is, the red light sensor 13R, the green light sensor 13G and the blue light sensor 13B is described; however, for example, the illumination light sensor 13 may include only one light sensor, and the light source 10 may time-sequentially turn on the red LED 1R, the green LED 1G and the blue LED 1B, thereby the illumination light Lout may be detected.

In the above-described embodiment, the case where the light source 10 includes the red LED 1R, the green LED 1G and the blue LED 1B is described; however, in addition to them (or instead of them), the light source 10 may include an LED emitting another color light. In the case where light of four or more colors is used, a color reproduction range can be expanded, and more various colors can be displayed.

In the above-described embodiment, the case where the liquid crystal display 3 is a transmissive liquid crystal display including the backlight system 1 is described; however, the light source device according to the embodiment of the invention may be used as a front light system to form a reflective liquid crystal display.

In the above-described embodiment, the liquid crystal display panel is described as an example of the display section; however, as the display section, any panel other than the liquid crystal display panel may be used.

For example, the light source device according to the embodiment of the invention is applicable to not only the light source device for liquid crystal display but also any other light source device such as an illumination device.

It should be understood by those skilled in the art that various modifications, combinations, sub-combinations and alterations may occur depending on design requirements and other factors insofar as they are within the scope of the appended claims or the equivalents thereof.

What is claimed is:

1. A light source system comprising:
a light source having a LIT state wherein the light source emits light and an UNLIT state wherein the light source does not emit light;
a light-sensing device operative for detecting light from the light source, the light-sensing device having an ON state wherein the light-sensing device detects light and an OFF state wherein the light-sensing device does not detect light;
a calculation means for calculating a net light amount by subtracting a measurement environment component from a light amount detected by the light-sensing device, the measurement environment component being independent of a lighting state in the light source; and
a light source control means for controlling the light source on the basis of the net light amount obtained by the calculation means,
wherein
the measurement environment component is composed of an electrical offset component of a circuit section including the light-sensing device and a background component which is a component other than the electrical offset component and
the calculation means operates in conjunction with the light source and the light-sensing device in a first light detection mode, a second light detection mode and a third light detection mode such that, in the first light detection mode, the light source is in the LIT state and the light-sensing device is in the ON state to determine a first detection light amount including an original light amount component, the background component and the electrical offset component, in the second light detection mode, the light source is in the UNLIT state and the light-sensing device is in the ON state to determine a second detection light amount including the background component and the electrical offset component, and, in the third light detection mode, the light source is in the UNLIT state and the light-sensing device is in the OFF state to determine a third detection light amount that equals the electrical offset component so that the calculation means calculates the background component by subtracting the third detection light amount from the second detection light amount and calculates the original light amount component by subtracting the background component and the electrical offset component from the first light sensor value.

2. The light source system according to claim 1, wherein the light source control means controls the light source by changing at least one of lighting duration and light emission intensity of the light source.

3. The light source system according to claim 1, wherein the light source includes a plurality of lighting sections controllable independently of one another.

4. The light source system according to claim 1, wherein the light source control means controls at least one of luminance and color temperature of the light source by changing at least one of lighting duration and light emission intensity of the light source.

5. The light source system according to claim 1, wherein the background component includes a light amount component resulting from environment light under measurement environment.

6. The light source system according to claim 5, wherein the environment light includes infrared light.

7. The light source system according to claim 1, comprising:
a switching control means for controlling switching between a plurality of the light detection modes, each of the modes is performed by utilizing the light-sensing device.

8. The light source system according to claim 7, wherein the switching control means controls switching between the first light detection mode and the second light detection mode.

9. The light source system according to claim 8, wherein the calculation means calculates the net light amount which is defined by the original light amount component resulting from light emitted from the light source, by subtracting the second detection light amount obtained in the second light detection mode from the first detection light amount obtained in the first light detection mode.

10. The light source system according to claim 8, wherein the switching control means further controls switching between the second light detection mode and the third light detection mode.

11. The light source system according to claim 10, wherein in the case that the background component calculated by the calculation means is equal to or more than a predetermined threshold, the light source control means suspends the control of the light source for a certain period.

12. A display device having a light source system, and a display section which modulates light emitted from the light source system on the basis of an image signal, wherein
the light source system comprises:
a light source having a LIT state wherein the light source emits light and an UNLIT state wherein the light source does not emit light;
a light-sensing device operative for detecting light from the light source, the light-sensing device having an ON state wherein the light-sensing device detects light and an OFF state wherein the light-sensing device does not detect light;
a calculation means for calculating a net light amount by subtracting a measurement environment component from a light amount detected by the light-sensing device, the measurement environment component being independent of a lighting state in the light source; and
a light source control means for controlling the light source on the basis of the net light amount obtained by the calculation means,
wherein
the measurement environment component is composed of an electrical offset component of a circuit section including the light-sensing device and a background component which is a component other than the electrical offset component and
the calculation means operates in conjunction with the light source and the light-sensing device in a first light detection mode, a second light detection mode and a third light detection mode such that, in the first light detection mode, the light source is in the LIT state and the light-sensing device is in the ON state to determine a first detection light amount including an original light amount component, the background component and the electrical offset component, in the second light detection mode, the light source is in the UNLIT state and the light-sensing device is in the ON state to determine a second detection light amount including the background component and the electrical offset component, and, in the third light detection mode, the light source is in the UNLIT state and the light-sensing device is in the OFF state to determine a third detection light amount that equals the electrical offset component so that the calculation means calculates the background component by subtracting the third detection light amount from the second detection light amount and calculates the original light amount component by subtracting the background component and the electrical offset component from the first light sensor value.

* * * * *